United States Patent Office 3,427,339
Patented Feb. 11, 1969

3,427,339
ALKOXYALKARYLALKYLSILANES AND CONDENSATES THEREOF
Edwin P. Plueddemann, Midland, Mich., assignor to Dow Corning Corporation, Midland, Mich., a corporation of Michigan
No Drawing. Filed Feb. 1, 1966, Ser. No. 523,864
U.S. Cl. 260—448.2    13 Claims
Int. Cl. C07f 7/18; C08g 31/09

ABSTRACT OF THE DISCLOSURE

The invention provides silanes of the formula $$X_nSiQArCH_2OR$$
$$\quad\quad R'_{3-n}$$

and siloxane condensates thereof, where R is a lower alkyl radical, Q is a divalent alkyl radical, Ar is selected from the group consisting of divalent aryl radicals and divalent aryl ether radicals, X is the hydroxyl or a hydrolyzable group, R' is a monovalent hydrocarbon radical of no more than 18 carbon atoms, and n has a value of 1 to 3, and illustrative silane is

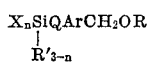
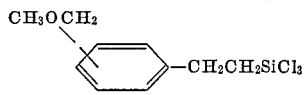

The novel compounds are useful as coating resins, chemical intermediates, and primers of high thermal stability for the adhesion of siliceous materials and metals to organic resins.

---

This application relates to novel organosilicon compounds which are useful as coating resins, chemical intermediates, and as primers of high thermal stability for the adhesion of siliceous materials and metals to organic resins. One such latter use of a composition of this invention is disclosed in U.S. Patent application Ser. No. 523,901 entitled Organosilicon Primers for Siliceous and Metallic Materials, filed Feb. 1, 1966.

The compositions of this invention are compounds selected from the group consisting of silanes of the formula $$X_nSiQArCH_2OR$$
$$\quad\quad R'_{3-n}$$

and condensates thereof,
where
R is a lower alkyl radical,
Q is a divalent alkyl radical,
Ar is selected from the group consisting of divalent aryl radicals and divalent aryl ether radicals,
X is the hydroxyl or a hydrolyzable group,
R' is a monovalent hydrocarbon radical, and
n has a value of 1 to 3.

R can be any lower alkyl radical such as methyl, ethyl, isopropyl, or butyl.
Ar is any divalent aryl radical such as phenylene, biphenylene,

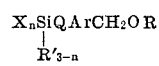

or

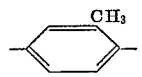
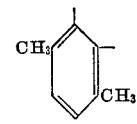

or any divalent aryl ether radical such as

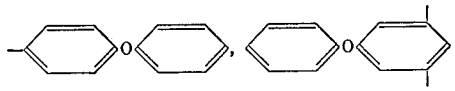

or

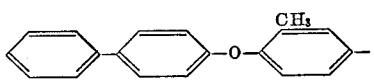

where both free valences are attached to aryl radicals.
Q can be any divalent alkyl radical such as dimethylene, trimethylene, octadecamethylene,

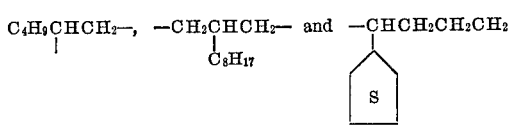

Q preferably has at least two carbon atoms, and is most preferably dimethylene.
X can be the hydroxyl group or any hydrolyzable group, e.g., alkoxide groups such as methoxide, ethoxide, propoxide, isohexoxide, and cyclohexoxide; halogen groups such as chloride, bromide, and fluoride; acyloxy groups such as acetate, propionate, and butyrate; ketoxime groups such as

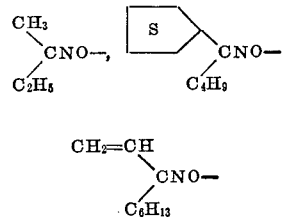

or

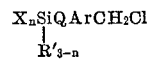

the amino group, and the isocyanate group.
R' is any monovalent hydrocarbon radical of no more than 18 carbon atoms, e.g. methyl, isobutyl, 2-ethylhexyl, dodecyl, octadecyl, cyclohexyl, vinyl, allyl, phenyl, xenyl, 2-phenylpropyl, and tolyl.
The compositions of this invention can be made by reacting a silane of the formula $$X_nSiQArCH_2Cl$$
$$\quad\quad R'_{3-n}$$

with RONa in a solvent such as methanol, where the symbols are as defined above. The above starting materials can be made by ordinary organic syntheses which are obvious to the skilled chemist.
The compositions of this invention can also be made by preparing a Grignard reagent from ROCH$_2$ArQBr, and then reacting that with a silane of the formula

where the symbols are defined above.
A third method of preparation is to react ROCH$_2$ArQ' with

in the presence of chloroplatinic acid, where Q' is a monovalent aliphatic hydrocarbon radical which contains one unsaturated group, e.g., a vinyl or allyl radical.

Examples of the silanes which are within the scope of this invention are

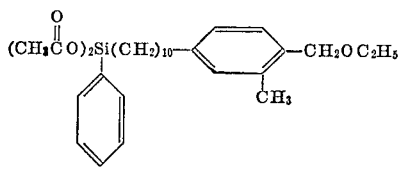

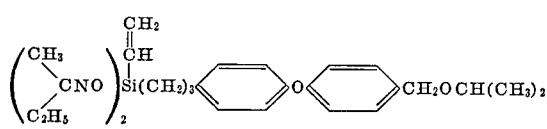

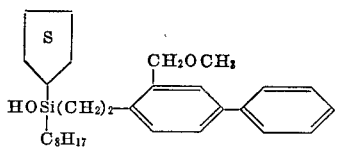

and

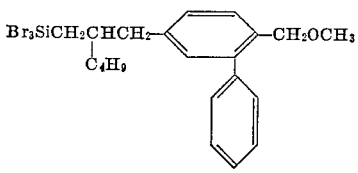

The condensates of the silanes of this invention generally form spontaneously upon exposure of the silanes to moisture by the well-known mechanisms of condensation of hydrolyzable silanes. During the condensation process, siloxane bonds are formed between silicon atoms, replacing the hydroxyl and hydrolyzable groups.

The condensation products can be polymers of the average unit formula

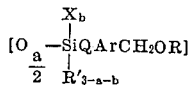

where $a$ has an average value of 1 to 3 and $b$ has an average value of 0 to 2, the sum of $a$ and $b$ being from 1 to 3, and the other symbols are defined above.

Examples of these condensation products are:

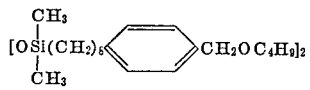

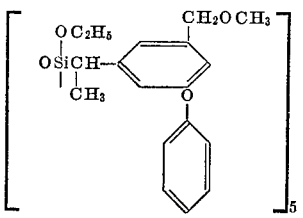

and

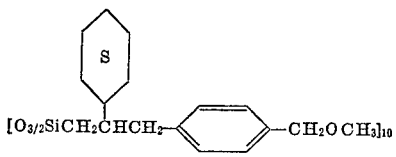

It is preferred for X to be chloride or methoxy, for $n$ to be 3, for $m$ to be 1, for Q to be dimethylene, for Ar to be phenylene, and for R to be methyl. Excellent primers can be prepared from the silanes of this invention having the above characteristics.

The following examples are illustrative only and should not be construed as limiting the invention which is properly delineated in the appended claims.

Example 1

To 30 g. of m-methoxymethylstyrene there was added 5 drops of isopropanol solution containing 1 weight percent of platinum in the form of chloroplatinic acid, and a trace of butylamine. This was heated to about 100° C., and 27 g. of trichlorosilane was added while maintaining the temperature at 100° to 120° C.

The mixture was then heated for one hour at 120° C., and then distilled.

Twenty-eight grams of

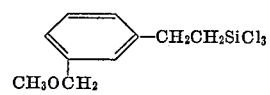

were recovered, B.P. 100° C. at 0.35 mm. pressure; $n_D^{26}$ 1.5162; density at 25° C. 1.23.

Several squares of No. 181 heat-cleaned glass cloth were dipped in a 0.5 weight percent toluene solution of the above silane and air-dried. The glass cloth was then dipped in water and dried for 7 minutes at 230° F. The cloth squares were pressed with polystyrene to form 14 ply laminates having a thickness of 0.142 in. The molding temperature was 572° F.

The tensile and compressive strengths of the laminates were measured both before and after 2 hours of immersion in boiling water:

Flexural strength (p.s.i.):
   Dry _____ 66,300
   After boil _____ 62,200
Compressive strength (p.s.i.):
   Dry _____ 31,200
   After boil _____ 22,600

These properties are greatly superior to those of equivalent unprimed laminates.

Example 2

A silane of the formula

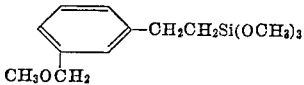

was prepared from

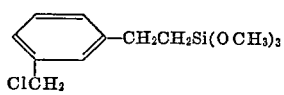

and sodium methoxide by refluxing in methanol for 4 hours. The reaction mixture was filtered to remove NaCl, and distilled to recover the product boiling at 122°–124° C. at 1 mm.; $n_D^{26}$ 1.4830; density at 25° C. —1.052.

Laminates similar to those of Example 1 were prepared from glass cloth which had been dipped in a 0.5 weight percent ethanol solution of

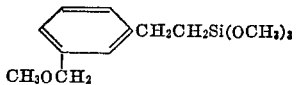

The laminates had a thickness of 0.145 in.
Their physical properties were:

Flexural strength (p.s.i.):
   Dry _____ 65,000
   After 2 hr. boil _____ 61,300
Compressive strength (p.s.i.):
   Dry _____ 27,100
   After 2 hr. boil _____ 27,800

This same silane product forms a hard, stable, protective coating upon application to an aluminum sheet and heating in the air for 1 hour at 200° C.

Example 3

When the following Grignard reagents are reacted with the following silanes, the following products are formed:

| Grignard Reagent | Silane | Product |
|---|---|---|
| (a) $C_2H_5OCH_2$-⟨⟩-O-⟨⟩-$(CH_2)_2MgCl$ | $ClSi(OC_3H_7)_2$ ⟨⟩ | $C_2H_5OCH_2$-⟨⟩-O-⟨⟩-$(CH_2)_2Si(OC_3H_7)_2$ ⟨⟩ |
| (b) $CH_3OCH_2$-⟨⟩-$CH_2\overset{CH_3}{\underset{CH_3}{C}}HCH_2MgCl$ | $C_{10}H_{21}SiCl_3$ | $CH_3OCH_2$-⟨⟩-$CH_2\overset{CH_3}{\underset{CH_3}{C}}H$-$CH_2SiCl_2$<br>$C_{10}H_{21}$ |
| (c) $CH_3O$-⟨⟩-⟨⟩-$(CH_2)_4MgCl$<br>(a mixture of ortho, meta, and para isomers) | $SiCl_4$ | $CH_3O$-⟨⟩-⟨⟩-$(CH_2)_4SiCl_3$ |

These products, and their hydrolyzates, all make superior primers for the adhesion of poly(ethylenediamine adipate) to silicone rubber when they are placed on the silicone rubber in a 10 percent solution of isopropanol, and the solvent is allowed to dry; and the thermoplastic is then applied to the silicon rubber at a temperature of 600° C.

Example 4

When 20 g. of

are reacted at 110° C. with 8 g. of methylhydrogendichlorosilane in the presence of 0.01 g. of chloroplatinic acid, the product

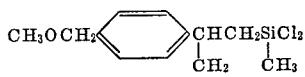

is formed.

When 5 g. of the above silane is added to 25 ml. of water, a water-insoluble, polymeric liquid of the unit formula

is formed, which is a useful solvent.

That which is claimed is:

1. A compound selected from the group consisting of silanes of the formula $$X_nSiQArCH_2OR$$
$$R'_{3-n}$$

where

R is a lower alkyl radical,
Q is a divalent alkyl radical,
Ar is selected from the group consisting of divalent aryl, radicals and divalent aryl ether radicals, the radical having no more than 18 carbon atoms,
X is the hydroxyl or a hydrolyzable group,
R' is a monovalent hydrocarbon radical of no more than 18 carbon atoms, and
n has a value of 1 to 3.

2. The silane of claim 1 of the formula

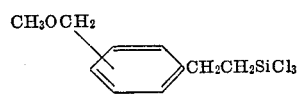

3. The silane of claim 1 of the formula

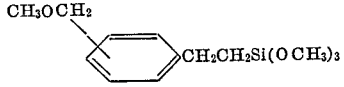

4. The silane of claim 1 where R' is methyl.
5. The silane of claim 1 where R is methyl.
6. The silane of claim 1 where X is methoxy.
7. The silane of claim 1 where X is chlorine.
8. The silane of claim 1 where Ar is phenylene.
9. The silane of claim 1 where n is 3.
10. The silane of claim 1 where Q is dimethylene.
11. A siloxane consisting essentially of units of the formula $$O_{\frac{a}{2}}-\underset{R'_{3-a-b}}{\overset{X_b}{Si}}QArCH_2OR$$

where

R is a lower alkyl radical,
Q is a divalent alkyl radical,
Ar is selected from the group consisting of divalent aryl radical and divalent aryl ether radicals, the radical having no more than 18 carbon atoms,
X is the hydroxyl or a hydrolyzable group,
R' is a monovalent hydrocarbon radical of no more than 18 carbon atoms,
a has an average value of from 1 to 3, and
b has an average value of from 0 to 2, the sum of a and b being from 1 to 3.

12. The siloxane of claim 11 where Ar is a phenylene radical.
13. The siloxane of claim 11 having the unit formula

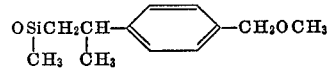

References Cited

UNITED STATES PATENTS

| 2,423,497 | 7/1947 | Harmon | 260—448.8 XR |
| 2,872,434 | 2/1959 | Barnes | 260—448.2 XR |
| 3,172,899 | 3/1965 | Bailey | 260—448.8 XR |

HELEN M. McCARTHY, *Primary Examiner.*

P. F. SHAVER, *Assistant Examiner.*

U.S. Cl. X.R.

260—448.8, 46.5